(12) United States Patent
Acheson

(10) Patent No.: US 10,472,020 B2
(45) Date of Patent: Nov. 12, 2019

(54) BICYCLE HAVING A BACKWARD PEDALING TRANSMISSION FOR FORWARD PROPULSION

(71) Applicant: John M. Acheson, Ogden, UT (US)

(72) Inventor: John M. Acheson, Ogden, UT (US)

(*) Notice: Subject to any disclaimer, the term of this patent is extended or adjusted under 35 U.S.C. 154(b) by 135 days.

(21) Appl. No.: 15/680,077

(22) Filed: Aug. 17, 2017

(65) Prior Publication Data

US 2018/0057110 A1 Mar. 1, 2018

Related U.S. Application Data

(60) Provisional application No. 62/379,695, filed on Aug. 25, 2016.

(51) Int. Cl.
| | |
|---|---|
| *B62M 1/36* | (2013.01) |
| *B62M 9/02* | (2006.01) |
| *F16H 57/035* | (2012.01) |
| *B62K 21/12* | (2006.01) |
| *F16H 57/12* | (2006.01) |

(52) U.S. Cl.
CPC ............... *B62M 1/36* (2013.01); *B62K 21/12* (2013.01); *B62M 9/02* (2013.01); *F16H 57/035* (2013.01); *F16H 57/12* (2013.01)

(58) Field of Classification Search
CPC .................................. B62M 1/36; B62M 9/02
See application file for complete search history.

(56) References Cited

U.S. PATENT DOCUMENTS

| 603,326 | A | * | 5/1898 | Feingold | ................. | B62M 1/36 |
|---|---|---|---|---|---|---|
| | | | | | | 280/237 |
| 5,435,583 | A | * | 7/1995 | Foster, Jr. | ................ | B62M 1/36 |
| | | | | | | 280/237 |
| 5,533,741 | A | * | 7/1996 | Matsuo | .................... | B62M 1/36 |
| | | | | | | 280/237 |
| 5,884,927 | A | * | 3/1999 | Mahaney | ................. | B62M 1/36 |
| | | | | | | 280/237 |

(Continued)

FOREIGN PATENT DOCUMENTS

| CN | 2626850 Y | 7/2004 |
|---|---|---|
| CN | 202379042 U | 8/2012 |

(Continued)

*Primary Examiner* — Kevin Hurley
(74) *Attorney, Agent, or Firm* — Thorpe North & Western, LLP.

(57) ABSTRACT

A backward pedaling bicycle comprises a frame, a rearward wheel and forward wheel rotatably coupled to the frame, a driving gear coupled to the rearward wheel, a pedaling gear rotatably coupled to the frame, first and second redirection gears rotatably coupled to the frame, a roller chain operatively coupled to the driving gear, the pedaling gear, and the first and second redirection gears, and an elongated steering stem and handle bars coupled to the frame and positioned to facilitate an upright seating position of the rider while pedaling and holding the handle bars. Accordingly, backward pedaling by the rider about the pedaling gear rotates the driving gear in a forward rotational direction via the first and second redirection gears, thereby causing forward propulsion of the backward pedaling bicycle. The first and second redirection gears can each be coupled between the pedaling gear and an axis of rotation of the forward wheel.

10 Claims, 3 Drawing Sheets

(56) References Cited

U.S. PATENT DOCUMENTS

| | | | |
|---|---|---|---|
| 6,695,332 B1 | 2/2004 | Kang | |
| 6,817,621 B2 * | 11/2004 | Varan | B62M 1/36 |
| | | | 280/261 |
| 7,497,793 B2 | 3/2009 | Hee | |
| 9,630,680 B1 * | 4/2017 | Griffith, Jr. | B62M 9/04 |

FOREIGN PATENT DOCUMENTS

| | | | |
|---|---|---|---|
| CN | 104229058 A | 12/2014 | |
| CN | 204895740 U | 12/2015 | |
| ES | 1 038 084 U | 5/1998 | |
| GB | 2143599 A * | 2/1985 | B62M 9/06 |

* cited by examiner

BICYCLE HAVING A BACKWARD PEDALING TRANSMISSION FOR FORWARD PROPULSION

BACKGROUND

In a typical bicycle the rear wheel is driven by a bicycle chain through a chain sprocket powered by a pedal shaft driven by the rider via a pair of bicycle pedals attached to the pedal shaft. To move in a forward direction, the rider applies force to the pedals causing them to rotate in the same rotational direction as a front wheel of the bicycle for forward motion. Some bicycles have certain gears for backward pedaling for forward motion. However, such backward-pedaling bicycles have complex and heavy machinery installed during manufacturing of the bike, particularly when the transmission is designed to allow forward and backward pedaling for forward motion. Moreover, backward pedaling (while holding standard waist-level handle bars) can be physically taxing on the rider, particularly over extended periods of riding time.

SUMMARY

In one example of the present disclosure there is provided a backward pedaling bicycle for forward propulsion. The bicycle can comprise: a frame; a forward wheel rotatably coupled to the frame and having an axis of rotation; a rearward wheel rotatably coupled to the frame; a driving gear assembly secured to the rearward wheel; a pedaling gear rotatably coupled to the frame and having an axis of rotation; an upper (or first) redirection gear rotatably coupled to the frame and having an axis of rotation positioned between the axis of rotation of the pedaling gear and the axis of rotation of the forward wheel; a lower (or first) redirection gear rotatably coupled to the frame and having an axis of rotation positioned between the axis of rotation of the pedaling gear and the axis of rotation of the forward wheel; and a roller chain operatively coupling together the driving gear assembly, the rearward gear, the upper redirection gear, and the lower redirection gear. Accordingly, backward pedaling about the pedaling gear rotates the driving gear assembly in a forward rotational direction, thereby causing forward propulsion of the backward pedaling bicycle.

In some examples, the bicycle can comprise a transmission support structure secured to the frame and configured to position the upper and lower redirection gears. The transmission support structure can comprise a left plate and a right plate secured to each other and to the frame such that at least a portion of the frame is positioned between the left and right plates. The left and right plates can structurally support a central axle of the upper redirection gear and a central axle of the lower redirection gear such that the upper and lower redirection gears are freely rotatable about the plates.

In some examples, the bicycle can comprise an elongated steering stem and handle bars coupled to the elongated steering stem. The handle bars can be positioned at a predetermined distance above a seating area or seating plane of the bicycle such that the arms of a rider are raised proximate a chest area or chest plane of the rider during backward pedaling of the bicycle and while holding the handle bars.

In some examples of the present disclosure there is provided a backward pedaling bicycle transmission assembly comprising: a driving gear assembly secured to a rearward bicycle wheel; a pedaling gear rotatably coupled to a bicycle frame; and a transmission support structure secured to the bicycle frame. The transmission support structure can have: an upper redirection gear positioned forward and on a first side the pedaling gear; and a lower redirection gear positioned forward and on a second side the pedaling gear. Accordingly, backward pedaling about the pedaling gear rotates the driving gear assembly via a roller chain operatively coupled to the upper and lower redirection gears, thereby causing forward propulsion of the bicycle via the driving gear assembly.

A method of riding the backward pedaling bicycle is provided, as discussed herein, and a method of making and/or retrofitting the transmission assembly to a bicycle is provided, as discussed herein.

Figure 1:
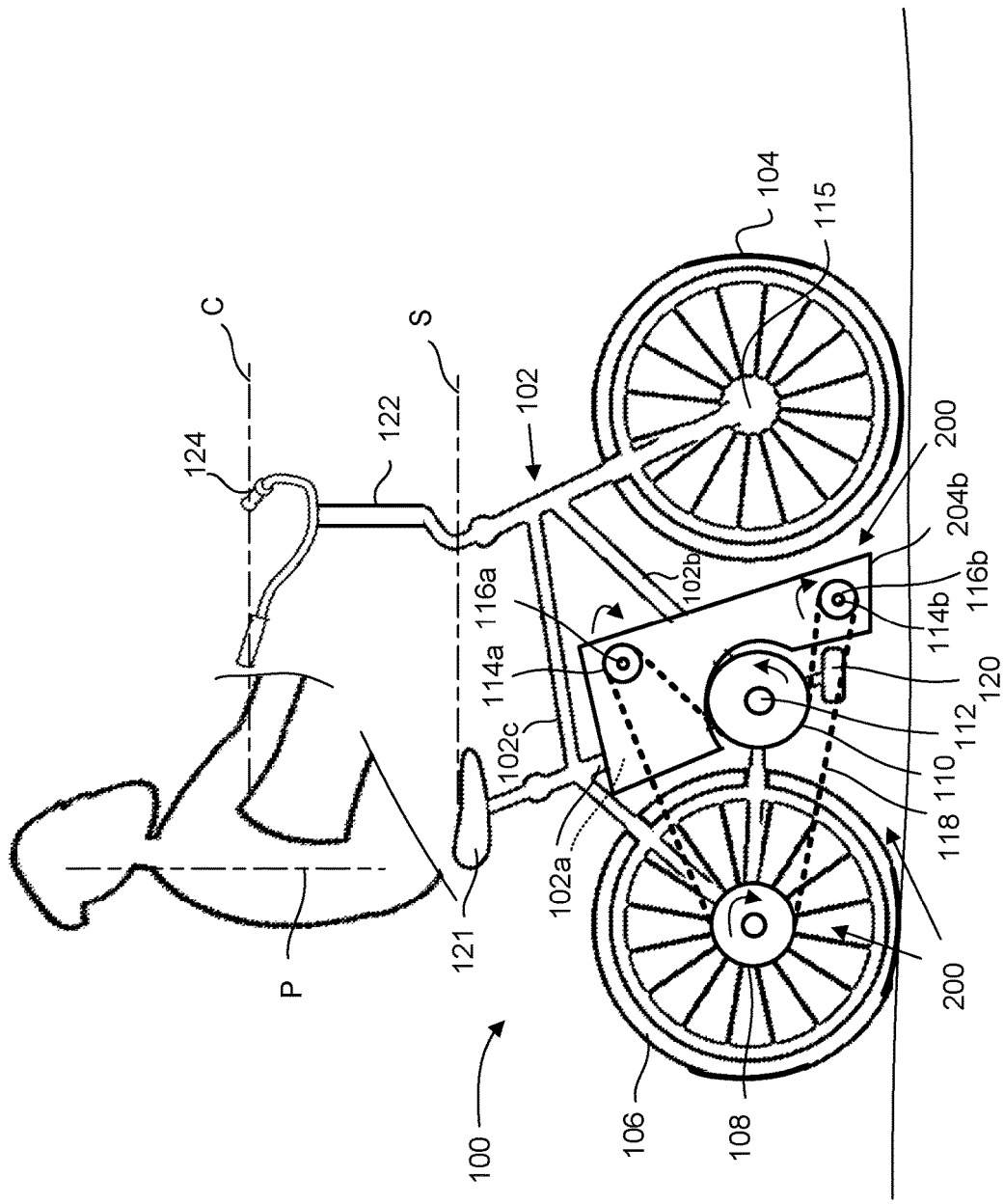
FIG. 1 shows a schematic illustration of a backward pedaling bicycle in accordance with an example of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "an inductor" includes reference to one or more of such features and reference to "inductively coupling" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

FIG. 1 illustrates one example of a backward pedaling bicycle 100 for forward propulsion. The bicycle 100 can comprise a frame 102 having a plurality of interconnected support members 102a-c (only three labeled). A forward wheel 104 is rotatably coupled to the frame and a rearward wheel 106 is rotatably coupled to the frame. A driving gear assembly 108 is secured to the rearward wheel, which can comprise a plurality of sprocket gears and derailleurs (as with typical multi-speed bicycles). A pedaling gear 110 is rotatably coupled to the frame and has an axis of rotation 112. The pedaling gear can comprise one or more sprocket gears (as with typical multi-speed bicycles).

A first redirection gear 114a (upper) is rotatably coupled to the frame (via transmission support structure 200; see FIG. 2) and has an axis of rotation 116a positioned forward and on a first side of the axis of rotation 112 of the pedaling gear 110 (i.e., the first redirection gear 114a is positioned above the pedaling gear 110). Said another way, the axis of rotation 116a is positioned between the axis of rotation 112 of the pedaling gear 110 and an axis of rotation 115 of the forward wheel 104 (both axes 112 and 115 are coming out of the page of FIG. 1). The first redirection gear 114a is therefore positioned between the pedaling gear 110 and the seating area of the bicycle.

A second redirection gear 114b (lower) is rotatably coupled to the frame 102 (via transmission support structure 200) and has an axis of rotation 116b positioned forward and on a second side of the axis of rotation 112 of the pedaling gear 110 (i.e., the second redirection gear 114b is positioned below the pedaling gear 110). Said another way, the axis of rotation 116b is positioned between the axis of rotation 112 of the pedaling gear 110 and the axis of rotation 115 of the forward wheel 104. The second redirection gear 114b is therefore positioned between the pedaling gear 110 and the ground surface.

The terms "above" and "below" connote a vertical orientation when the bicycle is upright while being ridden, such as the first/upper redirection gear having an axis of rotation "above" the axis of rotation of the pedaling gear, as illustrated on FIG. 1. And, the terms "forward" and "rearward" connote a horizontal orientation relative to a forward end or rearward end of the bicycle, such as the first/upper redirection gear having an axis of rotation "forward" the axis of rotation of the pedaling gear, as illustrated on FIG. 1.

A roller chain 118 is operatively coupled to the driving gear assembly 108, the pedaling gear 110, and the first and second redirection gears 114a and 114b. The pedaling gear 110 can have a pair of pedals 120 (one shown) coupled thereto for pedaling in a reverse direction. As illustrated by the arrows on the respective gears, backward pedaling about the pedaling gear 110 translates the roller chain, which rotates the driving gear assembly causing forward propulsion of the bicycle. As such, the first and second redirection gears 114a and 114b will rotate in a forward direction, as shown.

The bicycle 100 can comprise an elongated steering stem 122 and handle bars 124 secured to the elongated steering stem. The elongated steering stem 122 can be rotatably supported by the frame 102, and coupled to the forward wheel 104 for steering. As illustrated, the handle bars 124 can be positioned above a seat 121 (or seating plane S) of the bicycle (as compared to traditional bikes), such that the arms of the rider are raised near or above a chest area (or chest plane C) of the rider during backward pedaling of the bicycle. Said another way, the handle bars 124 can be positioned at a predetermined distance above the seat 121 such that the arms of the rider are raised or positioned proximate the chest area of the rider during backward pedaling of the bicycle and while holding the handle bars 124. In this manner, the rider can sit in an upright position during backward pedaling of the bicycle and while holding the handle bars, as illustrated on FIG. 1. Thus, the frontal plane P of the upper body of the rider is generally vertical while riding the bicycle. This provides improved riding leverage and better posture for the rider when backward pedaling, which can reduce fatigue on the muscles and joints of the rider.

With standard handle bars (being low and near the frame and seat) the rider quickly experiences muscle fatigue in the back and neck from being hunched over, and also in the arms due to the constant pulling on the handle bars during forward pedaling for proper leverage. And although backward pedaling (or backward walking) is not a common human motion, the raised handlebars 124 allow the rider to hold the bicycle above the rider's waist and proximate the rider's chest, which advantageously alters the necessary riding leverage to control the bicycle because the rider can sit upright with his arms extending outward from his chest to better direct the pedaling force induced by reverse pedaling. This is because the rider does not need to constantly pull on the handle bars when reverse pedaling, unlike forward pedaling bicycles. If the handlebars were at approximately waist level, the rider would not be able to exert as much force because of the natural shape of the rider's body (i.e., with waist-level handlebars riders reach downwardly to pull upwardly while backward pedaling). The result of the disclosed configuration is that the rider can operate the bicycle while backward pedaling for extended periods of time and distance as compared to forward pedaling bicycles having standard waist-level handle bars.

In one example, the handle bars 124 are positioned above the seat 121 at a predetermined distance being at least 18 inches, and in some cases at least 24 inches. In some examples, the handle bars 124 are positioned above a ground surface at a predetermined distance being at least 40 inches, and in some cases at least 48 inches. In one example, a length of the elongated stem 122 is greater than a height of the frame 102. Such frame height may be a typical frame height of 16, 17, 19, or 21 inches. Thus, the length of the elongated stem 122, as measured from the frame to the handle bars 124, can be greater than 16, 17, 19, or 21 inches, such as 22 inches. In a smaller-frame bicycle like 16 inches, the elongated stem 122 can be 18 inches, for instance. Thus, the size of the frame can correspond to the length of the elongated steering stem 122.

Figure 2:
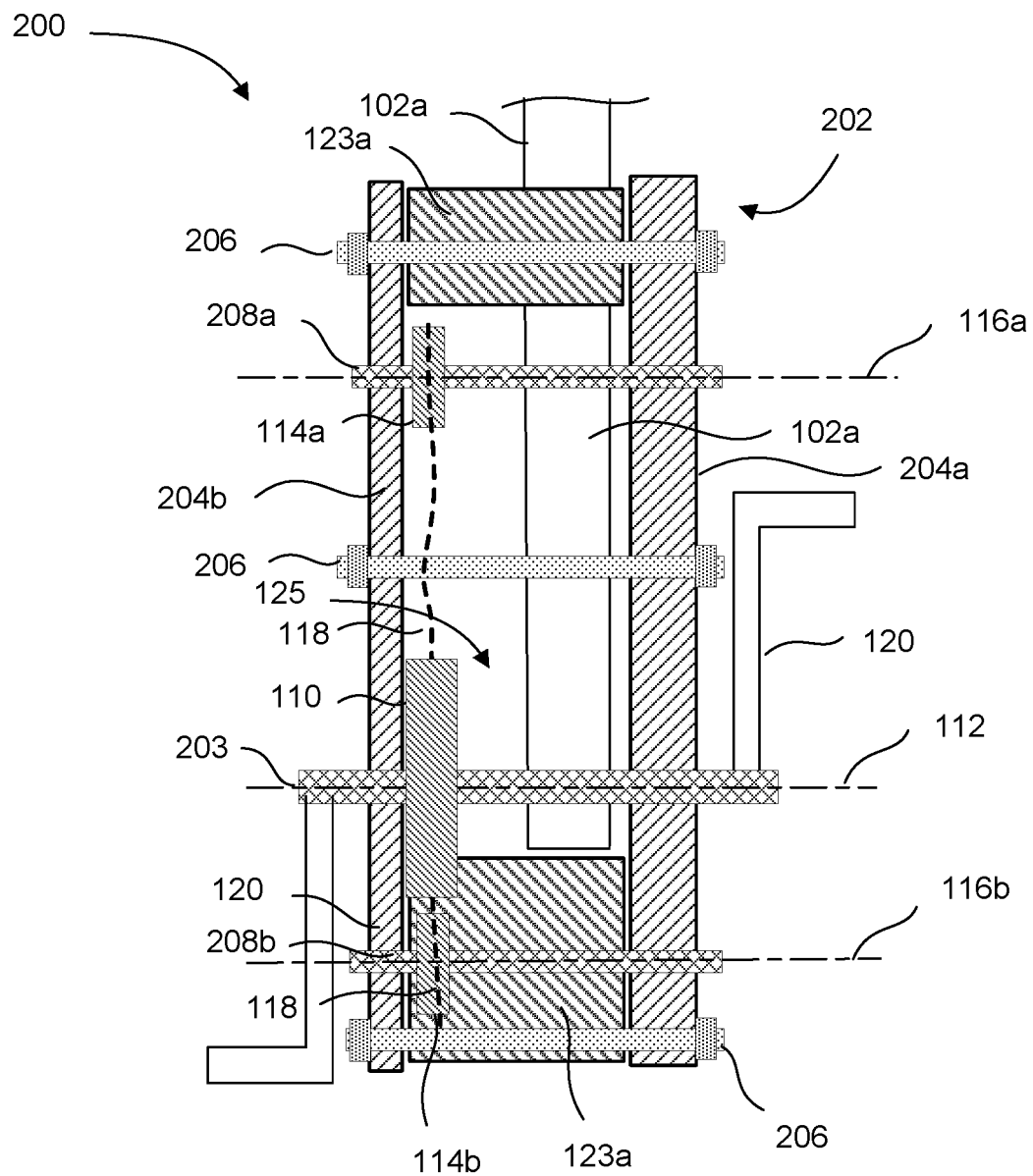
FIG. 2 shows a partial cross sectional front view of a transmission support structure that can support the redirection gears of FIG. 1 in accordance with an example of the present disclosure.

FIG. 2 is partial cross sectional front view of one example of a backward pedaling bicycle transmission assembly 200 couplable to a frame, such as can be coupled to the frame 102 of FIG. 1. The view shown on FIG. 2 is from a front perspective of the assembly 200, and showing one vertical support member 102a of the frame 102 for illustration purposes to shown how the transmission assembly 200 could be coupled to a support member of a frame. The transmission assembly 200 can include the driving gear assembly 108 (see FIG. 1), and the pedaling gear 110 secured to a central axle 203 that is rotatably coupled to a bicycle frame 102a. The transmission assembly 200 can comprise a transmission support structure 202 having a first support structure 204a and a second support structure 204b secured to each other by a plurality of fasteners 206 (e.g., nuts and bolts). Alternatively, the first and second support structures 204a and 204b may be secured using gluing, welding, or another fastening method. The first and second support structures 204a and 204b are positioned opposite each other and on either side of the frame 102a such that at least a portion of the frame (support members 102a and 102b; FIG. 1) are positioned between or "sandwiched" between the first and second support structures 204a and 204b. Alternatively, only one support structure (e.g., 204a) can be used such that the redirection gears 114a and 114b are exposed, similarly as shown on FIG. 1.

A first support member 123a can be coupled between the first and second support structures 204a and 204b, and a second support member 123b can be coupled between first and second support structures 204a and 204b. Support members 123a and 123b can be spatially separated from each other to provide rigid support to the first and second support structures 204a and 204b, or one or more such support members can extend around a perimeter of the first and second support structures 204a and 204b to define an enclosure 125, for instance. The enclosure 125 can surround or enclose the first and second redirection gears 114a and 114b, and even the pedaling gear 110 and a portion of the chain 118. The collective structures that define such enclosure 125 can prevent dirt and debris from entering the enclosure 125, thereby prolonging the life of the gears and chain therein.

The first and second support structures 204a and 204b can be left and right side plates or panels, and some or all of the fasteners 206 may be secured to the support member 102a of the frame 102 itself, or they may be only fastened to the plates such that the plates "pinch" the frame (as in FIG. 2).

The transmission support structure 202 supports the first redirection gear 114a having a central axle 208a (defining axis of rotation 116a) and the second redirection gear 114b having a central axle 208b (defining axis of rotation 116b). Both axles 208a and 208b of the redirection gears 114a and 114b can be fixedly secured to the first and second support structures 204a and 204b such that the redirection gears 114a and 114b are rotationally coupled to their respective axles 208a and 208b (e.g., by ball bearings, roller bearings, a bearing that is a square taper bicycle bottom bracket, etc.). Inversely, the redirection gears 114a and 114b can be secured to their respective axles 208a and 208b while the axles themselves are rotationally coupled to the first and second support structures 204a and 204b.

The redirection gears 114a and 114b can be sprocket gears that interface with the roller chain 118 for forward rotation of the redirection gears 114a and 114b during backward pedaling. One advantage of the transmission assembly 200 is that the support structures 204a and 204b, the redirection gears 114a and 114b, and the fasteners can be easily retrofitted or attached to an existing bike frame post-manufacture of the bike. Thus, the transmission assembly 200 can be removably coupled to a frame for returning the bicycle to a forward-pedaling bicycle, and then re-coupled to turn the bicycle for rearward pedaling. A smaller chain may be required, however.

In another example, the redirection gears 114a and 114b can be directly attached to the frame 102a via frame components that further define the frame, such as round bars and/or plates that are welded or otherwise fastened directly to the frame 102a.

Figure 3:
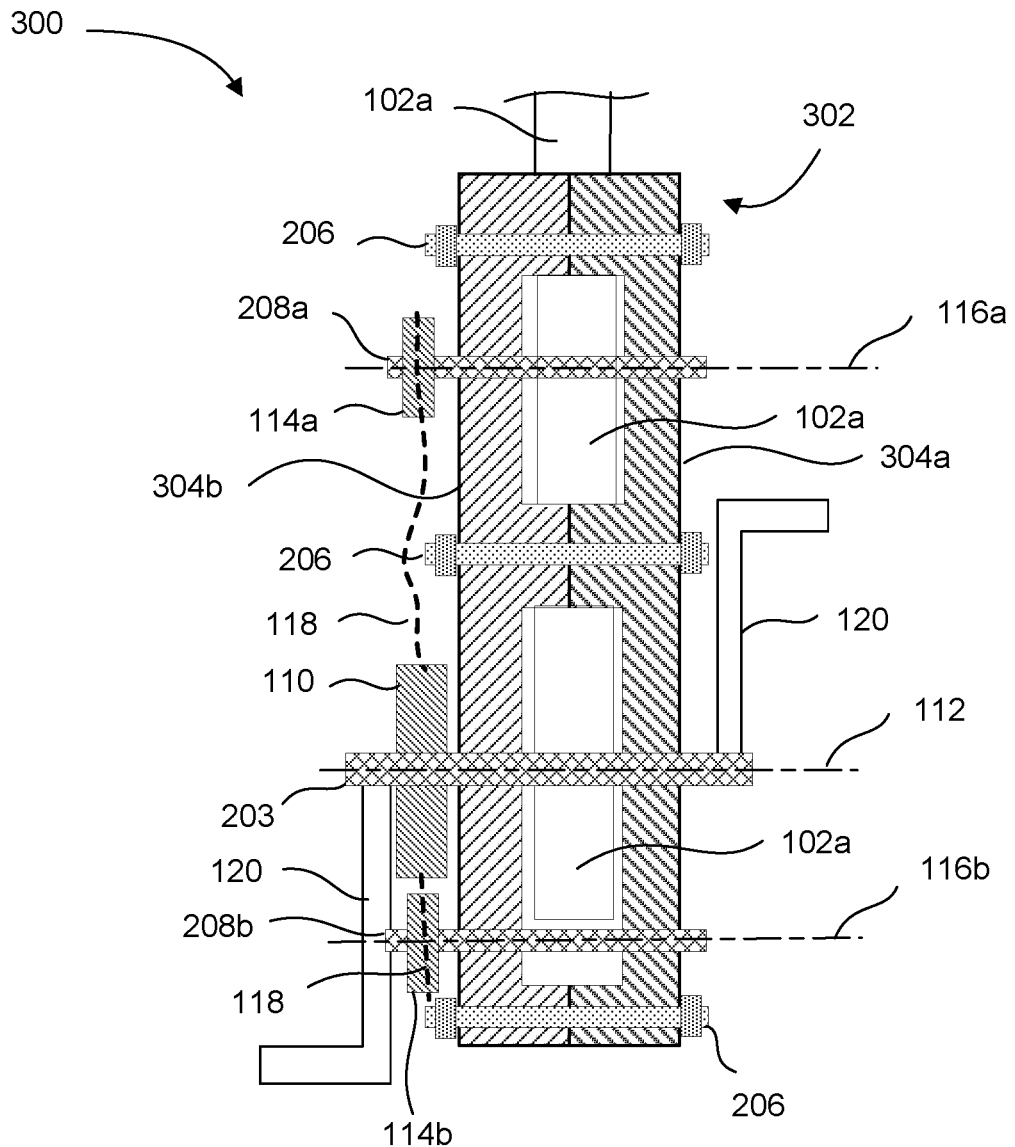
FIG. 3 shows a partial cross sectional front view of a transmission support structure that can support the redirection gears of FIG. 1 in accordance with an example of the present disclosure.

FIG. 3 is partial cross sectional front view of one example of a backward pedaling bicycle transmission assembly 300 coupleable to a frame, such as can be coupled to the frame 102 of FIG. 1. The view shown on FIG. 3 is from a front perspective of the assembly 300, and showing one support member 102a of the frame 102 for illustration purposes to show how the transmission assembly 300 could be coupled to a support member of a frame. The transmission assembly 300 can include the driving gear assembly 108 (see FIG. 1), and the pedaling gear 110 secured to the central axle 203 that is rotatably coupled to a portion of the frame 102. The transmission assembly 300 can comprise a transmission support structure 302 having a first support structure 304a and a second support structure 304b secured to each other by a plurality of fasteners 206 (e.g., nuts and bolts). Alternatively, the first and second support structures 304a and 304b may be secured using gluing, welding, or another fastening method. The first and second support structures 304a and 304b are positioned opposite each other and on either side of the frame 102a such that at least a portion of the frame (e.g., support members 102a and 102b; FIG. 1) are positioned between or "sandwiched" between the first and second support structures 304a and 304b.

Here, the first and second support structures 304a and 304b can be similarly shaped shells or casings that, when sandwiched together, trap or sandwich the support member 102a, while the fasteners 306 directly couple the first and second support structures 304a and 304b together. Thus, the first and second support structures 304a and 304b can have slots or recesses that receive portions of the support frame 102a when coupled to the frame 102.

The transmission support structure 302 supports the first redirection gear 114a having the central axle 208a (defining axis of rotation 116a) and the second redirection gear 114b having the central axle 208b (defining axis of rotation 116b). Both axles 208a and 208b of the redirection gears 114a and 114b can be fixedly secured to the first and second support structures 304a and 304b such that the redirection gears are rotationally coupled to their respective axles (e.g., by ball bearings, roller bearings, a bearing that is a square taper bicycle bottom bracket, etc.). Inversely, the redirection gears 114a and 114b can be secured to their respective axles while the axles are rotationally coupled to the first and second support structures 304a and 304b. The redirection gears 114a and 114b can be sprocket gears that interface with the roller chain 118 for forward rotation of the redirection gears 114a and 114b during backward pedaling.

The support structures discussed herein (204a, 204b, 304a, 304b) can be comprised of wood, particle board, composite, plastic, polymer, metal (steel, aluminum, etc.), carbon fiber, or combinations thereof.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A backward pedaling bicycle for forward propulsion, the bicycle comprising:
    a frame;
    a forward wheel rotatably coupled to the frame and a rearward wheel rotatably coupled to the frame, the forward wheel having an axis of rotation;
    a driving gear assembly secured to the rearward wheel;
    a pedaling gear rotatably coupled to the frame, the pedaling gear having an axis of rotation;
    an upper redirection gear rotatably coupled to the frame and having an axis of rotation positioned between the axis of rotation of the pedaling gear and the axis of rotation of the forward wheel;
    a lower redirection gear rotatably coupled to the frame and having an axis of rotation positioned between the axis of rotation of the pedaling gear and the axis of rotation of the forward wheel; and
    a roller chain operatively coupling together the driving gear assembly, the pedaling gear, the upper redirection gear, and the lower redirection gear, wherein backward pedaling by a rider about the pedaling gear rotates the driving gear assembly in a forward rotational direction, thereby causing forward propulsion of the backward pedaling bicycle.

2. The backward pedaling bicycle of claim 1, further comprising a transmission support structure secured to the frame and configured to position the upper and lower redirection gears.

3. The backward pedaling bicycle of claim 2, wherein the transmission support structure comprises a first support structure and a second support structure secured to each other, wherein at least a portion of the frame is positioned between the first and second support structures.

4. The backward pedaling bicycle of claim 1, further comprising an elongated steering stem and handle bars secured to the elongated steering stem, wherein the handle bars are positioned above a seating area of the bicycle at a predetermined distance such that the arms of a rider are raised proximate the chest area of the rider during backward pedaling of the bicycle.

5. The backward pedaling bicycle of claim 4, wherein the elongated steering stem and handle bars are positioned such that the rider can sit in an upright position during backward pedaling of the bicycle and while holding the handle bars.

6. The backward pedaling bicycle of claim 1, wherein the upper and lower redirection gears are configured to rotate in a forward direction, thereby causing forward rotation of the driving gear assembly via the roller chain.

7. A backward pedaling bicycle transmission assembly, the assembly comprising:
    a driving gear assembly secured to a rearward bicycle wheel;
    a pedaling gear rotatably coupled to a bicycle frame; and
    a transmission support structure secured to the bicycle frame and having:
        an upper redirection gear positioned between the pedaling gear and a front wheel of the bicycle; and
        a lower redirection gear positioned between the pedaling gear and the front wheel of the bicycle;
    wherein backward pedaling about the pedaling gear rotates the driving gear assembly via a roller chain operatively coupled to the upper and lower redirection gears, thereby causing forward propulsion of the backward pedaling bicycle via the driving gear assembly.

8. The assembly of claim 7, wherein the transmission support structure comprises a left plate and a right plate secured to each other and to the bicycle frame, wherein at least a portion of the bicycle frame is positioned between the left and right plates.

9. The assembly of claim 8, wherein the left and right plates structurally support a central axle of the upper redirection gear and a central axle of the lower redirection gear, such that the upper and lower redirection gears are freely rotatable about the plates.

10. The assembly of claim 7, wherein the transmission support structure is removably attached to the bicycle frame by a plurality of fasteners.

* * * * *